United States Patent [19]
Foster

[11] Patent Number: 5,806,660
[45] Date of Patent: Sep. 15, 1998

[54] RECIPROCATING SLAT CONVEYORS

[76] Inventor: Raymond Keith Foster, P.O. Box 1, Madras, Oreg. 97741

[21] Appl. No.: 882,618

[22] Filed: Jun. 25, 1997

[51] Int. Cl.$^6$ .................................................. B65G 25/00
[52] U.S. Cl. ..................................... 198/750.3; 414/525.1
[58] Field of Search ...................... 198/750.3; 414/525.1, 414/525.9

[56] References Cited

U.S. PATENT DOCUMENTS

| Re. 35,022 | 8/1995 | Foster | 198/750 |
|---|---|---|---|
| 4,749,075 | 6/1988 | Foster | 198/750 |
| 4,785,929 | 11/1988 | Foster | 198/750 |
| 5,165,524 | 11/1992 | Foster | 198/750 |
| 5,303,816 | 4/1994 | Foster | 198/750 |
| 5,323,894 | 6/1994 | Quaeck | 198/750.3 |
| 5,390,781 | 2/1995 | Foster | 198/750 |
| 5,560,472 | 10/1996 | Gist | 198/750 |
| 5,605,221 | 2/1997 | Foster | 198/750 |

Primary Examiner—Joseph E. Valenza
Attorney, Agent, or Firm—Delbert J. Barnard

[57] ABSTRACT

Alternate conveyor slats have laterally outwardly projecting, upper side portions, each with a depending, longitudinal, load transmitting bead (B). The beads (B) sit down on and slide longitudinally along bearing/seal surfaces (90a, 92a) that are a part of upper side portions of the intermediate conveyor slats (12). The alternate conveyor slats (10) are guided by longitudinal guide beams (14). Hold down members (20) secured to the guide beams (14) serve to resist unwanted upward movement of the conveyor slats (10). The intermediate conveyor slats (10) are snap-fitted onto bearings (18) which in turn are snap-fitted onto longitudinal guide and support beams (19). The weight of conveyor slats (10), and the weight of any load on the conveyor slats (10), is transmitted by the contact of the bead (B) with the bearing/seal surfaces (90, 92) to the conveyor slats (12). This weight, the weight of the conveyor slats (12), and the weight of any load on conveyor slats (12), is transmitted to the bearings (18) and from the bearings (18) to the guide and support beams (16).

21 Claims, 3 Drawing Sheets

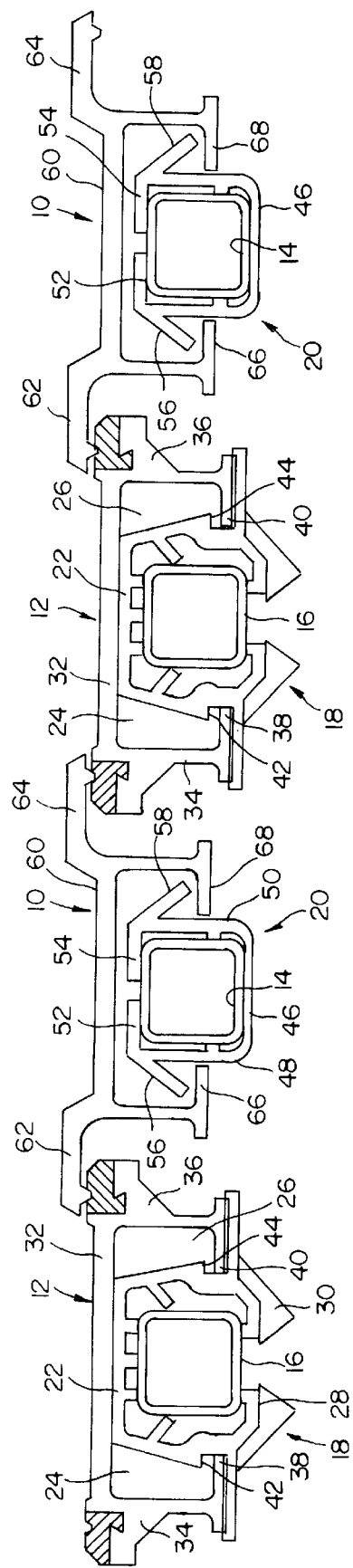

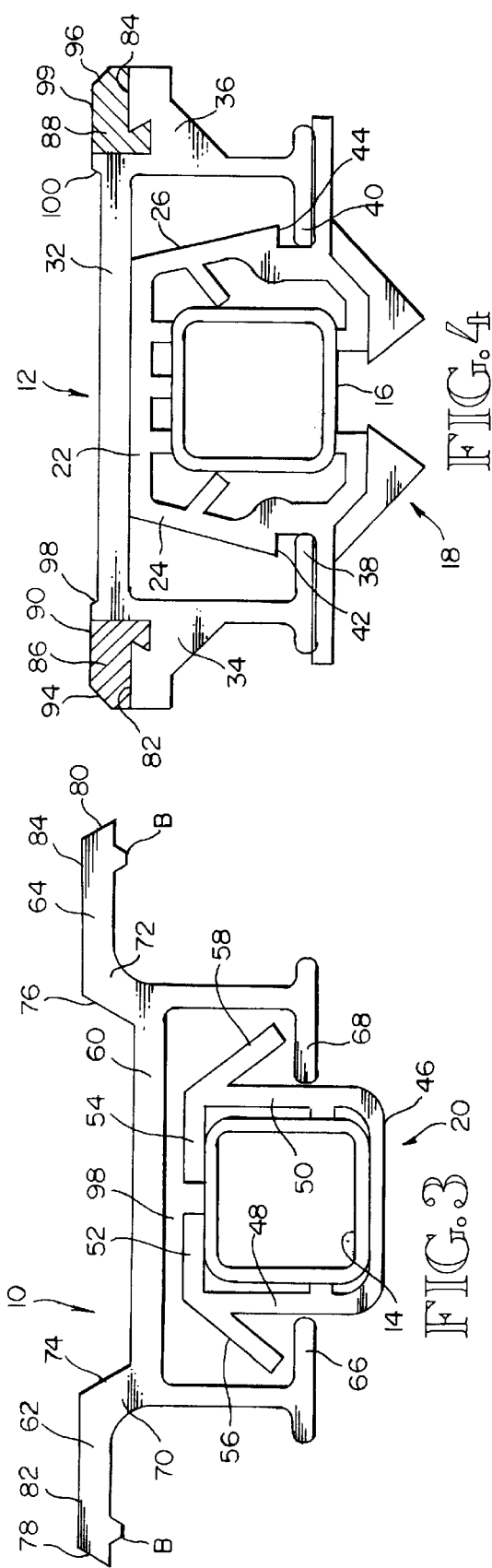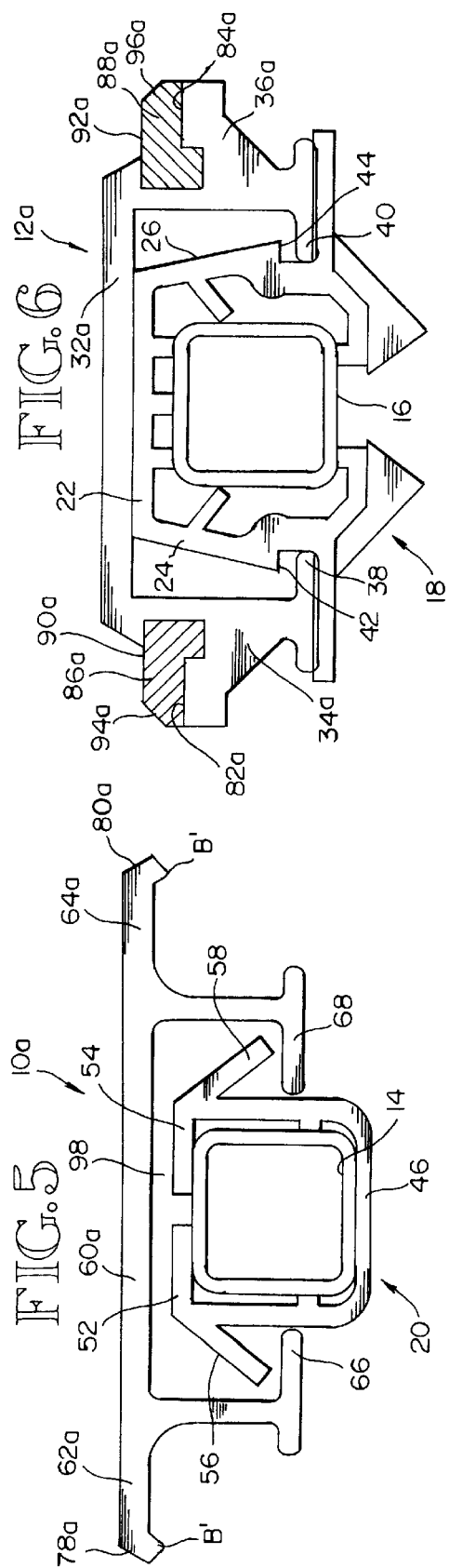

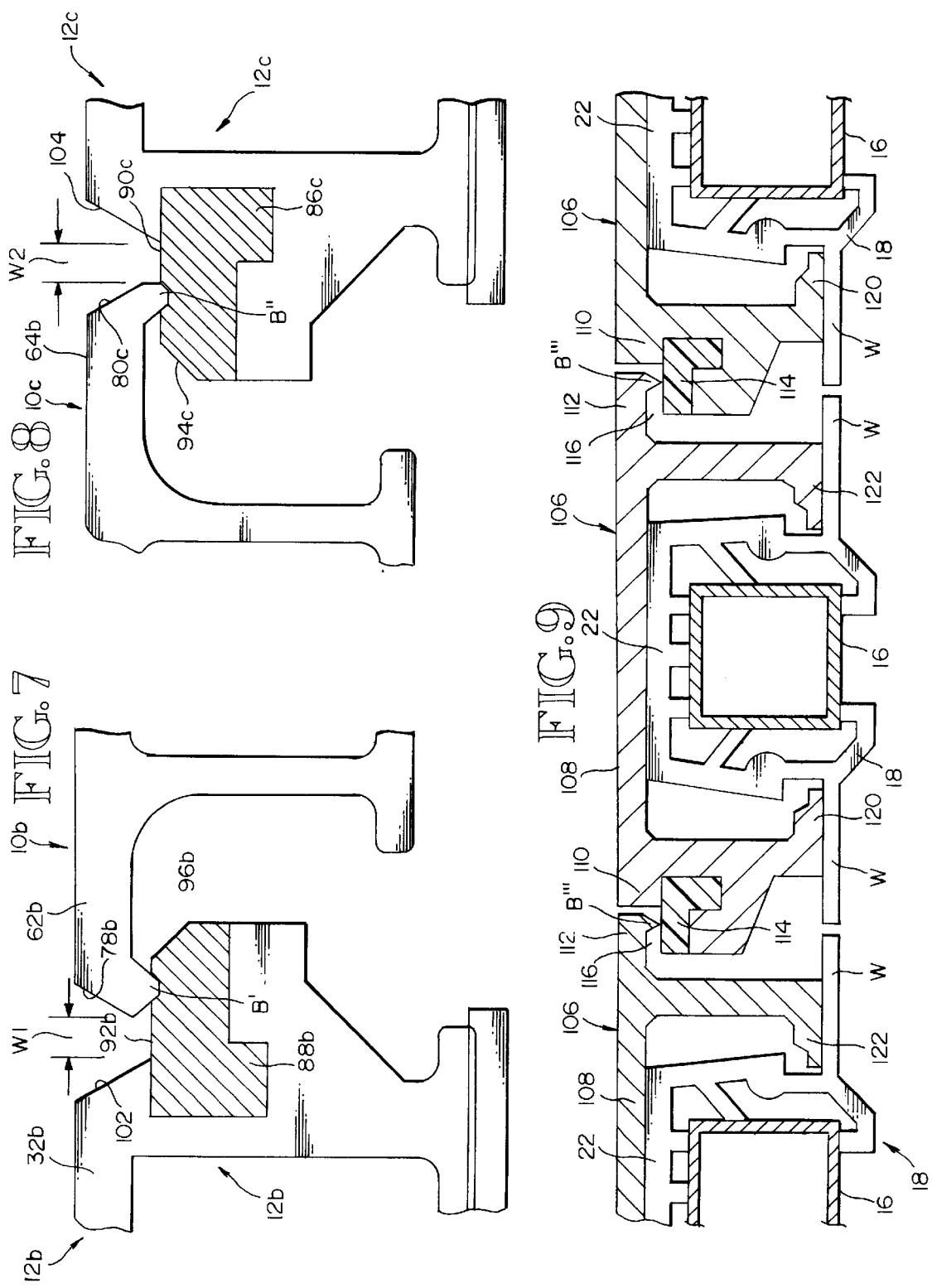

RECIPROCATING SLAT CONVEYORS

TECHNICAL FIELD

This invention relates to reciprocating slat conveyors. More particularly, it relates to the provision of conveyor slats with a pressure seal system between adjoining slats formed by the conveyor slats, that seals against passage of particulate material from a region above the conveyor slats to a region below the conveyor slats.

BACKGROUND OF THE INVENTION

A typical conveyor slat, bearing, support beam and seal system is disclosed by my U.S. Pat. No. 5,303,816, granted Apr. 19, 1994, and entitled Seal Strip for Reciprocating Floor Conveyors. In this system, plastic bearings are snap-fitted onto longitudinal support beams. The conveyor slats are snap-fitted onto the bearings. Each conveyor slat carries an elastomeric seal member on one side that makes sealing contact with an adjacent side of an adjoining conveyor slat. U.S. Pat. No. 5,560,472, granted Oct. 1, 1996, to Richard T. Gist, discloses a conveyor slat, bearing, support beam, and seal system which eliminates the elastomeric seal members. In their place, longitudinal support beams are positioned laterally between the conveyor slats. Upper portions of these support beams provide upwardly directed, hard plastic, bearing/seal surfaces. The conveyor slats have upper side portions that overhang the bearing/seal surfaces. These upper side portions of the conveyor slats include depending, longitudinal beads that contact and ride on the bearing/seal surfaces. The weight of the conveyor slats, and the weight of any load on the conveyor slats, is transmitted from the conveyor slats to the longitudinal support beams. This weight transfer occurs where the longitudinal slat beads contact and ride on the bearing/seal surfaces. The contact is a narrow line contact. Because the contact occurs along a relatively narrow line, a substantial force is generated which urges the longitudinal beads into a tight sealing contact with the bearing/seal surfaces. However, also because contact occurs along a relatively narrow line the area of contact is small resulting in the forces necessary to reciprocate the conveyor slats back and forth along the support beams being smaller. At the same time, the contact is a tight contact that effectively seals against passage of particulate material from a region above the conveyor slats to a region below the conveyor slats.

An object of the present invention is to provide a pressure seal system in which the pressure seal is provided by contacting adjacent portions of adjoining conveyor slats. The conveyor slats that transmit the load are guided by guide beams and are held in position relative to the guide beams but without any weight transfer from these conveyor slats to the guide beams. An advantage of making the bearing/seal surfaces a part of the conveyor slats is that their construction and placement can be controlled at the factory as a part of the manufacture of the conveyor slats. The installer need only install the longitudinal guide beams, snap-fit bearings on some of the beams and install hold down members on the others. It may also reduce costs because it reduces the amount of plastic material that is needed. In the system disclosed by U.S. Pat. No. 5,560,472, the members 30 and 56 are made from a plastic material that has a low friction surface characteristic. These members are continuous and are relatively large in cross-section in comparison with the bearing/seal members, the snap-on bearings and the hold down members that are utilized in at least some embodiments of the present invention.

DISCLOSURE OF THE INVENTION

The present invention is basically characterized by a first conveyor slat having a first upper side portion and a second conveyor slat adjoining the first conveyor slat and also having a first upper side portion. The first upper side portion of the first conveyor slat includes a longitudinally extending bearing/seal member having an upwardly directed, hard plastic bearing/seal surface. The first upper side portion of the second conveyor slat extends laterally over the bearing/seal surface of the bearing/seal member. It includes a depending, longitudinal support and seal bead. This bead has a lower edge that contacts and slides along the bearing/seal surface of the bearing/seal member. This contact of the lower edge of the bead with the bearing/seal surface seals against passage of particulate material from a region above the conveyor slats to a region below the conveyor slats. The weight of the second conveyor slat and the weight of the load on the second conveyor slat are transmitted downwardly from the second conveyor slat to the first conveyor slat via contact of the bead with the bearing/seal member.

In preferred form, the first conveyor slat has a second upper side portion that is like its first upper side portion and the second conveyor slat has a second upper side portion that is like its first upper side portion. Thus, the conveyor has two types of slats. The odd number slats are of a first type. The even number slats are of a second type. Herein, the odd number slats are sometimes referred to as the alternate slats. The even number slats are sometimes referred to as the intermediate slats.

In an embodiment of the invention, the second conveyor slat includes a top panel portion that is positioned laterally between its upper side portions. The upper side portions of the second conveyor slat extend upwardly and outwardly from the top panel and then laterally outwardly into a position over and covering the bearing/seal surfaces of the bearing/seal members carried by the adjoining first conveyor slats. In this embodiment, the first conveyor slat has a top panel portion that is positioned laterally between its first and second upper side portions and such top panel portion is at a level below the level of the upper side portions of the second conveyor slat.

In accordance with an aspect of the invention, longitudinal guide beams are provided for the first and second conveyor slats. Bearings are provided on the longitudinal guide beam for the first conveyor slat. The first conveyor slat is supported on these bearings. The weight of the first conveyor slat and the weight of any load on the first conveyor slat are transmitted downwardly from the first conveyor slat onto the bearings and from the bearings to the longitudinal guide beam of the first conveyor slat. Hold down members are provided on the longitudinal guide beam for the second conveyor slat. The hold down members each has a portion that engages the longitudinal guide beam and a portion that engages the second conveyor slat. There is no transfer of the weight of the second conveyor slat, or the weight of a load on the second conveyor slat, from the second conveyor slat to the hold down members. The weight of the second conveyor slat and the weight of the load on the second conveyor slat are instead transmitted downwardly from the second conveyor slat to the first conveyor slat via the contact of the depending bead on the second conveyor slat with the bearing/seal member that is carried by the first conveyor slat. The hold down members function to resist upward movement of the second conveyor slat up from its longitudinal guide beam.

In a second embodiment, the first conveyor slat has a second upper side portion that is like its first upper side portion and the second conveyor slat has a second upper side portion that is like its first upper side portion. The first conveyor slat has a top panel portion that is positioned laterally between its upper side portions. The bearing/seal members are positioned substantially directly laterally outwardly from this top panel portion. The second conveyor slat includes a top panel portion that is positioned laterally between its upper side portions. The top panel portion of the first conveyor slat and the top panel portion of the second conveyor slat are substantially at the same level. The upper side portions of the second conveyor slat extend upwardly from the top panel portion of the second conveyor slat and then laterally outwardly into a position over and covering the bearing/seal surfaces of the bearing/seal members. The upper side portions of the second conveyor slat have top surfaces that are above the top panel portions of the first and second conveyor slats. They also have outer edge surfaces that extend downwardly from such top surfaces towards outer side boundaries of the top panel portion of the first conveyor slat.

Preferably, the first upper side portion of the first conveyor slat has a downwardly and outwardly sloping edge surface that is laterally outwardly of where the lower edge of the depending, longitudinal bead contacts the bearing/seal surface of the bearing/seal member. This sloping edge surface facilitates movement of fines laterally outwardly from the region of the bead. This feature minimizes the accumulation of fines on the bearing/seal surface.

In a further embodiment of the invention, the first conveyor slat has a second upper side portion that is like its first upper side portion and the second conveyor slat has a second upper side portion that is like its first upper side portion. The first conveyor slat has a top panel portion that is positioned laterally between its first and second upper side portions. The bearing/seal members are positioned below the level of the top panel portion of the first conveyor slat. The second conveyor slat includes a top panel portion that is positioned laterally between its upper side portions. The first and second upper side portions of the second conveyor slat are substantially laterally outwardly extending continuations of the top panel portions of the second conveyor slat. The lower edges of the depending, longitudinal beams on the upper side portions of the second conveyor slat contact and ride the bearing/seal surfaces on the upper side portions of the first conveyor slat. The top panel portion of the first conveyor slat and the top panel and upper side portions of the second conveyor slat are all substantially coplanar.

In another embodiment of the invention, the first conveyor slat has a second upper side portion that is like the first upper side portion of the second conveyor slat. The second conveyor slat has a second upper side portion that is like the first upper side portion of the first conveyor slat. In this embodiment, a plurality of pairs of first and second conveyor slats are placed side-by-side, with the lower edge of the depending, longitudinal bead on one side of each conveyor slat contacting and sliding along a bearing/seal surface on an adjoining conveyor slat. An advantage of this embodiment is that it is only necessary to make one style of conveyor slat.

Additional features, advantages and objects of the invention are described in the detailed description of the best mode and preferred embodiments and/or inherent in the structures that are illustrated and described. Such detailed descriptions, the drawings, and the claims which follow are all parts of the description of the invention.

BRIEF DESCRIPTION OF THE DRAWINGS

In the drawings, like element designations refer to like parts throughout, and:

FIG. 1 is an end view of four adjoining conveyor slats, showing a first embodiment of the invention;

FIG. 2 is a view like FIG. 1 but showing a second embodiment of the invention;

FIG. 3 is an end view of the alternate conveyor slats shown in FIG. 1;

FIG. 4 is an end view of the intermediate conveyor slats shown in FIG. 1;

FIG. 5 is an end view of the alternate conveyor slats shown in FIG. 2;

FIG. 6 is an end view of the intermediate conveyor slats shown in FIG. 2;

FIG. 7 is an enlarged scale fragmentary end view of adjacent side portions of adjoining conveyor slats of a third embodiment of the invention;

FIG. 8 is a view like FIG. 7 but of a fourth embodiment of the invention; and

FIG. 9 is a fragmentary cross-sectional view of one full conveyor slat, its guide beam and a bearing, and fragmentary portions of the two flanking conveyor slat/guide beam/bearing assemblies, in a fifth embodiment of the invention.

BEST MODE FOR CARRYING OUT THE INVENTION

A substantially complete reciprocating slat conveyor system is disclosed by my U.S. Pat. No. 5,165,524, granted Nov. 24, 1992 and entitled Reciprocating Floor Conveyor. Such patent discloses one suitable form of drive unit for reciprocating the conveyor slats. Other suitable drive units, each having its own particular advantages, are disclosed by my U.S. Pat. No. 5,390,781, granted Feb. 21, 1995, and entitled Mounting Assembly and Method for Reciprocating Slat Conveyor, by my U.S. Pat. No. Re. 35,022, granted Aug. 22, 1995, and entitled Reduced Size Drive/Frame Assembly for a Reciprocating Floor Conveyor, and by my U.S. Pat. No. 5,605,221, granted Feb. 25, 1997, and entitled Drive Unit With Bearing Mount. The contents of these patents are hereby incorporated herein by this specific reference.

My aforementioned U.S. Pat. No. 5,165,524, with reference to FIGS. 2–6 of that patent, describes the most popular operational sequence of a reciprocating slat conveyor. FIGS. 7 and 8 of that patent show a typical framework that forms the base of the conveyor. It includes opposite side beams (designated 12 in that patent) interconnected by a plurality of longitudinally spaced apart transverse beams (designated 18 in that patent). Longitudinal guide beams (designated 20 in that patent) are mounted on the transverse beams 18. Bearings (designated 50 in that patent) are secured to the guide beams 20. The conveyor slats (designated 40 in that patent) sit down on and engage the bearings 52. The present invention relates to a similar arrangement of longitudinal guide beams, bearings and conveyor slats, but involves a different construction of the conveyor slats and the bearing and seal structures that are associated with the conveyor slats.

Referring to FIGS. 1, 3 and 4, showing a first embodiment of the invention, the conveyor slats of this embodiment are of two types. Every other slat, here the "odd number" or "alternate" slats are designated 10. The in between slats, here the "even number" or intermediate slats, are designated 12. Both types of slats 10, 12 are associated with longitudinal guide beams 14, 16. Beams 14 are herein referred to as guide beams because they only perform a guiding function. Beams 16 are herein referred to as guide and support beams because they carry and transmit weight in addition to guiding the slats. Except for their lateral spacing, the beams 14, 16 are like the beams that are designated 20 in my aforementioned U.S. Pat. No. 5,165,524. The beams 14, 16 extend longitudinally of the conveyor and are secured to transverse frame beams, such as beams 18 shown in U.S. Pat. No. 5,165,524, or to some other suitable base structure.

Snap-on bearings 18 are longitudinally spaced along the guide and support beams 16, where the beams 16 cross over the transverse frame beams. See for example FIGS. 11 and 12 of my U.S. Pat. No. 4,785,929, granted Nov. 22, 1988, and entitled Bearing System for Reciprocating Floor Conveyor. This patent is hereby incorporated herein by this specific reference. U.S. Pat. No. 4,785,929 presents a thorough illustration and description of the bearing 18. For that reason, the description of the bearings will not be repeated in this document except for an identification of the major parts of the bearings 18. Each bearing 18 includes a top panel 22 that contacts its guide beam 16, opposite side portions 24, 26 that depend downwardly from the top portion 22, and lower portions 28, 30. FIGS. 7–10 of U.S. Pat. No. 4,785,929 show how the bearings 18 are installed on the beams 16 and how the conveyor slats 12 are installed on the bearings 18.

The conveyor slats 12 each include a top panel portion 32 and opposite upper side portions 34, 36. The upper side portions 34, 36 extend downwardly from the top portion 32. Each slat 12 has a lower side portion 34, 36, each including an inwardly directed flange 38, 40. When the conveyor slats 12 are installed, the top panel portions 32 of the conveyor slats 12 rest on and slide longitudinally along the top portions 22 of the bearings 18. The flanges 38, 40 of the conveyor slats 12 are received in longitudinal slots in the bearings 18 below lock surfaces 42, 44.

For reasons that will be hereinafter described, the bearings 18 are not positioned on the guide beams 14. Instead, the guide beams 14 are provided with a plurality of longitudinally spaced apart hold down members 20 such as illustrated and described in detail in my U.S. Pat. No. 4,749,075, granted Jun. 7, 1988, and entitled Hold Down Member for a Reciprocating Floor Conveyor. The contents of U.S. Pat. No. 4,749,075 is hereby incorporated herein by this specific reference. Here, it will suffice to say that hold down members 20 have bottom, side and top portions 46, 48, 50, 52, 54 which engage the guide beams 14 and are installed onto them from below the guide beams 14. When installed, the hold down members 20 provide laterally outwardly and downwardly sloping lock flanges 56, 58.

Conveyor slats 10 have upper portions composed of a top panel 60 and a pair of opposite upper side portions 62, 64. Conveyor slats 10 also have lower side portions that depend from the regions where the top panel portion 60 meets the upper side portions 62, 64. The lower side portions include inwardly directed flanges 66, 68. When the hold down members 20 are installed on the guide beams 14, and when the conveyor slats 10 are installed on hold down members, the lock flanges 56, 58 are positioned above the slat flanges 66, 68 in a position to block or restrain upward movement of the conveyor slats 10, in response to upward forces imposed on the conveyor slats. This is well illustrated and described in my aforementioned U.S. Pat. No. 4,749,075. See FIG. 7 of that patent, for example.

As shown by FIG. 3, the upper side portions 62, 64 of conveyor slat 10 are vertically offset above the top panel portions 60. Diagonal transition walls 70, 72 extend upwardly and outwardly from the top panel portion 60 to the upper side portions 62, 64. Transition walls 70, 72 have upper surfaces 74, 76 that slope upwardly and outwardly from the top panel portions 60 to the upper side portions 62, 64. These surfaces 74, 76 are edge surfaces and they may be referred to as the inner edge surfaces of the upper side portions 62, 64. The upper side portions 62, 64 also have outer edge surfaces 78, 80 that slope downwardly and outwardly from the top surfaces 82, 84 of the upper side portions 62, 64. Preferably, the conveyor slats 10, 12 are extruded from an aluminum alloy, or some other metal, or a suitable structural plastic. Or, they are formed by pultrusion and include longitudinally and laterally directed fibers within a resin matrix. This construction forms the subject matter of my copending U.S. patent application Ser. No. 08/832,370, filed Apr. 12, 1997, and entitled Pultruded Conveyor Slats. This application is hereby incorporated herein by this specific reference.

Referring to FIG. 4, the conveyor slats 12 are extruded to include longitudinal channels 82, 84 in which a hard plastic bearing/seal member is received and retained. The longitudinal channels 82, 84, and the bearing/seal members 86, 88, form the upper side portions of the conveyor slats 12. Bearing/seal members 86, 88 have upwardly directed bearing/seal surfaces which may be substantially flush with the upper surface of top panel portion 42, or may be elevated a slight distance above it, as illustrated in FIG. 4.

Each upper side portion 62, 64 is providing with a depending, longitudinally extending, load carrying bead B, having a lower edge that contacts and rides on the upper surfaces 90, 92 of the bearing/seal members 86, 88. The lower edge may be relatively sharp, blunt or rounded. Preferably, the beads B are the only portions of conveyor slats 10 that make a load transmitting contact with the conveyor slats 12. Bearing/seal members 86, 88 may include beveled outer edge surfaces 94, 96 that slope outwardly and downwardly from the top surfaces 90, 92, respectively. The purpose of beveled edge surfaces 94, 96 is described later on in this document.

As shown by FIG. 1, the upper side portions 62, 64 of the conveyor slats 12 rest on the upper side portions of the conveyor slats 12. Specifically, the longitudinal beads B substantially make a line contact with the bearing/seal surfaces 90, 92. The weight of the slats 10, and the weight of any load on the slats 10, is transmitted from conveyor slats 10 to conveyor slats 12 by this contact of beads B to bearing/seal members 86, 82. There is always a vertical space 98 between the top portions 52, 54 of the hold down members 20 and the top panel portion 60 of the conveyor slats 10. Thus, there is no place other than where the beads B contact the bearing/seal members 86, 88 for weight to be transmitted to some structure below the conveyor slats 10. As previously described, the top panel portions 32 of the conveyor slats 30 sit down on and ride along the top walls 22 of the bearings 18. The bearings 18 rest on the guide and support beams 16. Thus, the weight of conveyor slats 12, and any load on the conveyor slats 12, including the load imposed by the contact occurring where the beads B contact the surfaces 90, is transmitted from the conveyor slats 12 to the bearings 18 and from the bearings 18 to the longitudinal guide and support beams 16. Thus, in the manner just described, the entire weight of the conveyor slats 10, 12, and any load on the conveyor slats 10, 12, is transmitted to and carried by the longitudinal guide and support beams 16.

In the embodiment of FIGS. 1, 3 and 4, the top panel portion 60 of conveyor slat 10, the bearing/seal members 86, 88, and the top panel portion 32 of conveyor slat 12 are all substantially coplanar. The upper side portions 62, 64 of conveyor slats 10 are offset vertically above the top panel portions 32, 60. They form what are in effect ridges that cover the bearing/seal members 86, 88. The beveled edge surfaces 74, 76, 78, 80 provide the ridges with relatively wide bases and relatively narrow tops. Conveyor slats 12 may include sloping edge walls 98, 100 immediately laterally outwardly of the top panel portions 20. These edges 98, 100 are in effect continuations of the edge surfaces 78, 80.

The embodiment shown by FIGS. 2, 5 and 6 differ from the embodiment disclosed by FIGS. 1, 3 and 4 in that the upper side portions 62a, 64a of the conveyor slat 10a are substantially coplanar with the top panel portion 60a and the top panel portion 32a. For this to happen, the bearing/seal members 86a, 88a are offset below the top panel portions 32a. This places the bearing/seal surfaces 90a, 92a at a level that is close to the level of the lower surfaces of the top panel portions 32a, 60a, as best shown by FIG. 2. In this embodiment, the beads B' are more in the nature of downwardly turned lips at the outer boundaries of the upper side portions 66a, 64a. In this embodiment, the bearing/seal members 86a, 88a include beveled outer edge surfaces 94a, 96a.

FIG. 7 illustrates a third embodiment of the invention. This embodiment is much like the second embodiment. A key difference is that a lateral space or gap w1 is provided between the edge surfaces 80b, 102. As illustrated, edge surfaces 80b, 102 slope downwardly and outwardly from the tops of the conveyor slats 10b, 32b. In other words, the space between the edge surfaces 80b, 102 converges from top to bottom. The narrow dimension, designated wl in FIG. 7, is at least about one-fourth of an inch. In this embodiment, the bead B' is essentially like bead B' in the embodiment of FIGS. 2, 5 and 6. It has a laterally rounded or somewhat blunt lower edge that contacts and rides on the bearing/seal surface 92b of bearing/seal member 88b. The outwardly and downwardly sloping edge surface 96b on the bearing/seal member 88b is a short distance laterally away from the contact of the bead B' with bearing/seal surface 92b. As a result, any fines that migrate into the gap and find their way between the bead B1 and the bearing/seal surface 92b will, within a small distance, slide or fall off of the edge surface 96b into the region below the conveyor slats 10b, 32b.

The embodiment shown by FIG. 8 is very similar to the embodiment shown by FIG. 7. The difference is in the shape of the load transmitting bead B". In the embodiment of FIG. 7 (and also in the embodiment of FIGS. 1, 5 and 6), the bead B' has downwardly converging side surfaces that meet at a laterally rounded apex. In the FIG. 8 embodiment, the outside surface of the bead B" is substantially vertical and the inside surface slopes downwardly and outwardly to the apex. In this embodiment, the apex is shown to be laterally rounded. In other embodiments, the converging surfaces (FIG. 7) or the vertical and sloping surfaces (FIG. 8) may come to a relatively sharp edge or apex, or may intersect a narrow blunt lower edge surface. In all of the embodiments, the contact between the beads B, B', B" is substantially a line contact. The area of contact is relatively small. As a result, the friction forces are relatively small even though the downward forces that promote sealing are relatively large.

FIG. 9 discloses a fifth embodiment of the invention. In this embodiment there is only one type of conveyor slat 106. Each conveyor slat has a top panel portion 108 that is laterally between upper side portions 110, 112. Upper side portions 110 may be like the side portions on conveyor slats 12, 12a, 12b, 12c. These upper side portions include bearing/ seal members 114 having upwardly directed bearing/seal surfaces 116. The opposite upper side portions of these conveyor slats 106 are like the upper side portions 62, 64, 62a, 64a, 62b, 64b of the first four embodiments. They each include a depending, longitudinal, load transmitting bead B'". this embodiment the bead B'" is shown to have a relatively sharp lower edge that is contact with the bearing/ seal surface 116. An advantage of this embodiment is that it requires only one style of conveyor slat.

The bearings 18 include side wings W which are below lower side edge portions 120, 122 of the conveyor slats 106. As described in my aforementioned U.S. Pat. No. 4,785,929, column 7, lines 40–44, the wings W may provide upper surfaces which act as bearing surfaces for the flanges of the floor members. Preferably, the bearings 18 and the conveyor slats 106 are dimensioned so that the beads B'" will be allowed to bear down tightly on the bearing surfaces 116. However, there will be some contact between the floor slats 106 and the top panels 22 of the bearings 18, and/or the wings W, so that the weight of the conveyor slats 106, and the weight of any load on the conveyor slats 106, will be transmitted to the guide and support beams 16.

As is well-known in the art, the bearings 18 and the hold down members 20 are constructed from a hard plastic material that has low friction surface characteristics. This same material may be used for forming the bearing/seal members 86, 88, 86a, 88a, 86b, 88b, 86c, 88c and 114. In the aforementioned U.S. Pat. No. 5,560,472, this material is referred to as a high molecular weight resinous material, sometimes referred to in the trade as UHMW material. This material is available from several manufacturers. It is strong and is easily formed into the desired shape and has exceptionally low surface abrasion which transcends into an excellent bearing relationship between it and the beads B, B', B", B'".

As clearly shown in FIGS. 1, 2, and 7–9, when the beads B, B', B", B'" are in a load transferring relationship with the bearing surfaces, there is no other part of the upper side portion or portions of the slats 10, 10a, 10b, 10c, 106 that is in contact with any part of any slat 12, 12a, 12b, 12c, 108. In the first four embodiments, the only weight transfer from slats 10, 10a, 10b, 10c to the slats 12, 12a, 12b, 12c occurs where the beads B, B', B" contact the bearing surfaces 90, 92, 90a, 92a, 90b, 92b, 90c, 92c. All other portions of the slats 10, 10a 10b, 10c are spaced vertically above whatever structure is below it. The lower surfaces of the upper side portions 62, 64, 62a, 64a, 62b, 64b, 62c, 64c are all spaced above whatever structure is below them. A vertical gap is formed that results in the only contact being between the beads and the bearing/seal surfaces.

As explained in U.S. Pat. No. 5,560,472, over a period of time, the beads B, B', B", B'" will wear longitudinal grooves in the bearing/seal surfaces 90, 92, 90a, 92a, 90b, 92b, 90c, 92c. As the bearing/seal members wear, the amount of surface area contact between the beads B, B', B", B'" and the bearing/seal surfaces 90, 92, 90a, 92a, 90b, 92b, 90c, 92c and 116 increases with a result that, with such greater surface contact the seal becomes further enhanced as the beads ride in the grooves.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A reciprocating slat conveyor, comprising:

a first conveyor slat having a first upper side portion;

a second conveyor slat adjoining said first conveyor slat and having a first upper side portion that is adjacent the first upper side portion of the first conveyor slat;

said first upper side portion of said first conveyor slat including a longitudinally extending bearing/seal member having an upwardly directed, hard plastic bearing/seal surface; and said first upper side portion of said second conveyor slat extending laterally over the bearing/seal surface of the bearing/seal member, and including a depending, longitudinal support and seal bead with a lower edge that contacts and slides along the bearing/seal surface of said bearing/seal member, whereby the contact of the lower edge of said bead with the bearing/seal surface seals against passage of particulate material from a region above the conveyor slats to a region below the conveyor slats, and wherein the weight of said second conveyor slat and the weight of the load on said second conveyor slat are transmitted downwardly from the second conveyor slat to the first conveyor slat via contact of the bead with the bearing/seal member.

2. A reciprocating slat conveyor according to claim 1, wherein the first conveyor slat has a second upper side portion that is like its first upper side portion and the second conveyor slat has a second upper side portion that is like its first upper side portion.

3. A reciprocating slat conveyor according to claim 2, wherein the second conveyor slat includes a top panel portion that is positioned laterally between its upper side portions, and wherein the upper side portions of the second conveyor slat extend upwardly from the top panel of the second conveyor slat and then laterally outwardly into a position over and covering the bearing/seal surfaces of the bearing/seal members.

4. A reciprocating slat conveyor according to claim 2, wherein the first conveyor slat has a top panel portion that is positioned laterally between its first and second upper side portion that is at a level below the level of the upper side portions of the second conveyor slat.

5. A reciprocating slat conveyor according to claim 1, further comprising longitudinal guide beams for the first and second conveyor slats, and bearings on the longitudinal guide beams for the first conveyor slat on which the first conveyor slat is supported, whereby the weight of the first conveyor slat and the weight of the load on the first conveyor slat are transmitted downwardly from the first conveyor slat onto the bearings and from the bearings to the longitudinal guide beam for the first conveyor slat.

6. A reciprocating slat conveyor according to claim 5, further comprising hold down members on the longitudinal guide beams for the second conveyor slat, said hold down members having a portion that engages the longitudinal guide beam and a portion that engages the second conveyor slat, without the weight of the second conveyor slat, or the load on the second conveyor slat, being transmitted to the hold down members, whereby the weight of the second conveyor slat and the weight of the load on the second conveyor slat are transmitted downwardly from the second conveyor slat to the first conveyor slat via the contact of the depending bead and the bearing/seal member, and the hold down members will resist upward movement of the second conveyor slat up from its longitudinal guide beam.

7. A reciprocating slat conveyor according to claim 1, wherein the first conveyor slat has a second upper side portion that is like its first upper side portion and the second conveyor slat has a second upper side portion that is like its first upper side portion, wherein the first conveyor slat has a top panel portion that is positioned laterally between its upper side portions, and said bearing/seal members are positioned substantially directly laterally outwardly from the top panel portion of the first conveyor slat, wherein the second conveyor slat includes a top panel portion that is positioned laterally between its upper side portions, wherein the top panel portion of the first conveyor slat and the top panel portion of the second conveyor slat are substantially at the same level, and wherein the upper side portions of the second conveyor slat extend upwardly from the top panel portion of the second conveyor slat and then laterally outwardly into a position over and covering the bearing/seal surfaces of the bearing/seal members.

8. A reciprocating slat conveyor according to claim 7, wherein the upper side portions of the second conveyor slat have top surfaces that are above the top panel portions of the first and second conveyor slats, and further have outer edge surfaces that extend downwardly from such top surfaces towards outer side boundaries of the top panel portion of the first conveyor slat.

9. A reciprocating slat conveyor according to claim 1, wherein the first upper side portion of the first conveyor slat has a downwardly and outwardly sloping edge surface that is laterally outwardly of where the lower edge of the depending, longitudinal bead contacts the bearing/seal surface of the bearing/seal member.

10. A reciprocating slat conveyor according to claim 1, wherein t he first conveyor slat has a second upper side portion that is like its first upper side portion and the second conveyor slat has a second upper side portion that is like its first upper side portion, wherein the first conveyor slat has a top panel portion that is positioned laterally between its first and second upper side portions, wherein said bearing/seal members are positioned below the level of the top panel portion of the first conveyor slat, wherein the second conveyor slat includes a top panel portion positioned laterally between its upper side portions, wherein the first and second upper side portions of the second conveyor slat are substantially laterally outward continuations of the top panel portion of the second conveyor slat, and wherein when the lower edges of the depending, longitudinal beads on the upper side portions of the second conveyor slat contacting and ride on the bearing/seal surfaces on the upper side portions of the first conveyor slat, and the top panel portion of the first conveyor slat and the top panel and upper side portions of the second conveyor slat are all substantially coplanar.

11. A reciprocating slat conveyor according to claim 10, wherein the top panel portion of the first conveyor slat has a top surface and opposite side edge surfaces that slope downwardly and outwardly from the top surface to the bearing/seal surfaces.

12. A reciprocating slat conveyor according to claim 11, wherein the top panel and side portions of the second conveyor slat have an upper surface and the upper side portions have opposite edge surfaces which slope downwardly and outwardly from the upper surface to the bearing/seal member that is contacted by the depending, longitudinal edges.

13. A reciprocating slat conveyor according to claim 12, wherein there is a lateral space between the side edge surface of the top panel portion of the first conveyor slat and the side edge surface of the adjoining upper side portion of the second conveyor slat that is at least substantially about one quarter of an inch wide.

14. A reciprocating slat conveyor according to claim 13, wherein the upper side portions of the first conveyor slat each has a downwardly and outwardly sloping edge surface that is below the bearing/seal surface and is laterally outwardly of where the lower edge of the depending, longitudinal bead contacts the bearing/seal surface of the bearing/seal member.

15. A reciprocating slat conveyor according to claim 1, wherein the first conveyor slat has a main body extruded to include a longitudinal groove in which the bearing/seal member is received, such groove including at least one lower surface on which the bearing/seal member rests and at least one upper surface that is substantially coplanar with the bearing/seal surface of the bearing/seal member.

16. A reciprocating slat conveyor according to claim 1, wherein the first conveyor slat has a second upper side portion that is like the first upper side portion of the second conveyor slat and the second conveyor slat has a second upper side portion that is like the first upper side portion of the first conveyor slat, whereby a plurality of pairs of first and second conveyor slats can be placed side-by-side, with the lower edge of the depending, longitudinal bead on one side of each conveyor slat contacting and sliding along a bearing/seal surface on an adjoining conveyor slat.

17. A reciprocating slat conveyor according to claim 16, wherein the first and second conveyor slats have top panel portions that are substantially coplanar, and include top surfaces, and wherein the bearing/seal surface is offset downwardly from the top surfaces of the panels a distance equal to the vertical dimension of the first side portion of the second conveyor slat in the region of the longitudinal edge.

18. For a reciprocating slat conveyor, an elongated conveyor slat comprising:

a top panel portion having an upper load contacting surface and a lower bearing contacting surface; and opposite upper side portions connected to said top panel portion and each including a longitudinally extending, upwardly directed, hard plastic bearing/seal surface generally forming an upper outside corner.

19. A conveyor slat according to claim 18, wherein the bearing/seal surfaces are substantially flush with or project slightly above the upper load contacting surface of the top panel portion.

20. A conveyor slat according to claim 18, wherein the bearing/seal surfaces are substantially at the level of the lower bearing contact surface of the top panel portion.

21. A conveyor slat according to claim 18, having a main body extruded to include a pair of longitudinal grooves in upper outside regions of said side portions, and further having a bearing/seal member secured in each said groove, said bearing/seal members presenting the said bearing/seal surfaces.

* * * * *